US011100695B1

(12) United States Patent
O'Hagan et al.

(10) Patent No.: US 11,100,695 B1
(45) Date of Patent: Aug. 24, 2021

(54) METHODS AND SYSTEMS FOR CREATING AN IMMERSIVE CHARACTER INTERACTION EXPERIENCE

(71) Applicant: Verizon Patent and Licensing Inc., Arlington, VA (US)

(72) Inventors: Colleen Elizabeth O'Hagan, Los Angeles, CA (US); Benjamin Michael Roffee, Yucca Valley, CA (US); Ian Nelson, Beverly Hills, CA (US); Patrick Ian Moss, Los Angeles, CA (US); Alastair D Macleod, Maria Del Rey, CA (US); Kevin Gorgonia, La Habra, CA (US); Adnan Nabeel Ghani, Northridge, CA (US); Eric Day, Inglewood, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/818,853

(22) Filed: Mar. 13, 2020

(51) Int. Cl.
*G06T 13/40* (2011.01)
*G06F 3/01* (2006.01)

(52) U.S. Cl.
CPC .............. *G06T 13/40* (2013.01); *G06F 3/011* (2013.01)

(58) Field of Classification Search
None
See application file for complete search history.

(56) References Cited

U.S. PATENT DOCUMENTS

2013/0267318 A1* 10/2013 Pryor .................... A63F 13/02
463/32
2016/0104452 A1* 4/2016 Guan .................... A63F 13/35
345/633

* cited by examiner

*Primary Examiner* — Vu Nguyen

(57) ABSTRACT

An exemplary character interaction system located at a first site receives character behavior data representative of captured behavior of a real-world performer located at a second site. Based on the character behavior data, the system presents, to an interactive user at the first site, a representation of a virtual character avatar that performs, in real-time synchrony with the real-world performer at the second site, the captured behavior of the real-world performer. During this presentation of the virtual character avatar, the system provides user video data representative of captured behavior of the interactive user for presentation to the real-world performer to allow the real-world performer to interact in real time with the interactive user via the virtual character avatar. The system also generates an augmented representation of an interaction between the virtual character avatar and the interactive user for presentation to a non-interactive observer. Corresponding methods and systems are also disclosed.

20 Claims, 10 Drawing Sheets

METHODS AND SYSTEMS FOR CREATING AN IMMERSIVE CHARACTER INTERACTION EXPERIENCE

BACKGROUND INFORMATION

In a variety of entertainment, educational, vocational, promotional, and/or other applications and use cases, it may be desirable for a user (e.g., an entertainment viewer, a student, an employee, a target patron, etc.) to be able to interact with a character of some type. For example, patrons of an amusement park may interact with a character from a movie or television show that is represented by an actor wearing a costume. As another example, people attending a zoo or museum may be invited to ask questions of a subject of an exhibit (e.g., a wild animal, a funnel cloud, etc.) that are "answered" by a voiceover of an expert who speaks for the subject.

While these conventional types of character interactions may be enjoyable and valuable to users, they do not tend to be particularly immersive or true-to-life. For example, even small children are generally cognizant of the difference between interacting with a true character and a person in a costume. Accordingly, it would be desirable to create character interaction experiences that are more immersive, authentic, and memorable for the users who experience them.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
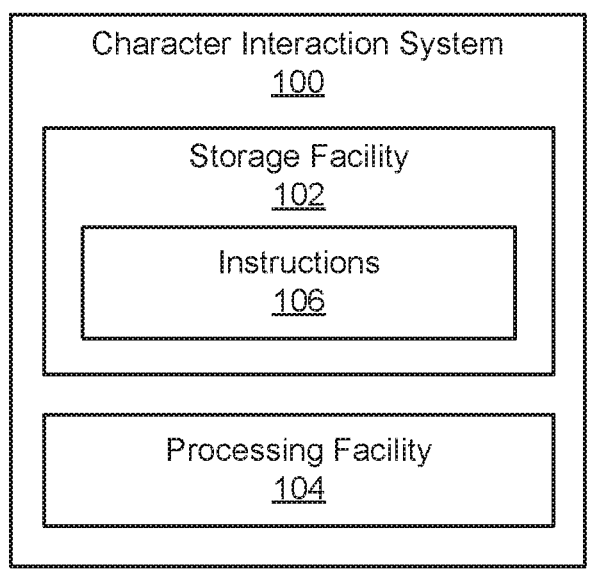
FIG. 1 illustrates an exemplary character interaction system for creating an immersive character interaction experience according to embodiments described herein.

Methods and systems for creating an immersive character interaction experience are described herein. As used herein, a "character" may refer to any human being (e.g., a real person, a fictional person, a historical person, a mythical person, etc.) or to a non-human entity or personality that is imbued with certain human-like characteristics (e.g., being able to verbally interact in a human-like way, taking a human-like appearance, moving in a human-like manner, etc.). In some examples, characters may be fictional and may inhabit imaginary worlds other than the real world. For example, animated characters may inhabit animated worlds that are completely imaginary or based on real world places. In other examples, characters may be real people who inhabit (or, at some point in history have inhabited) the real world, and who may be embodied by actors or animated representations or the like. Certain characters, both real and fictional, may be represented in various forms of entertainment media such as books, movies, television shows, video games, comic strips, or the like. Such characters may be brought to life by real people (i.e., actors) who embody the characters and try to emulate the traits of the characters. Additionally, the broad definition of a "character" used herein may, in certain implementations, include real people who are living their lives in the real world and who are not playing a part or pretending to be anyone other than themselves.

Accordingly, as used herein, a "character interaction experience" may refer to any encounter that a person might have with a character or animated object (or an embodiment thereof), especially when that encounter includes an interactive element where the person and the character are able to see one another, verbally interact (e.g., converse) with one another, physically interact with one another, and/or otherwise interact. As mentioned above, conventional character interaction experiences have typically involved relatively non-immersive or non-realistic character simulations such as people dressing in costumes, voiceovers attributed to non-speaking entities (e.g., animals, inanimate objects, etc.) that embody the characters, or the like.

In contrast, as set forth in detail below, "immersive character interaction experiences" described herein refer to character interaction experiences that exceed conventional character interaction experiences in terms of immersiveness, quality, realism, memorability, and/or various other aspects. For example, methods and systems described herein may involve: 1) real-time capture of behavior data (e.g., motion capture data) at one location; 2) real-time character interaction at a separate location by way of a screen (e.g., a video wall, etc.) that displays a virtual character avatar interacting with users while being controlled by the captured behavior data (e.g., virtual puppeteering); 3) full-duplex audio and video communication between the two locations; and 4) extended reality (e.g., augmented reality, mixed reality, virtual reality, etc.) technology, provided to non-interactive observers witnessing the character interaction, that augments the immersiveness of the character interaction experience even more (e.g., allowing the virtual character avatar to come out of the screen into the real world, etc.).

Such immersive character interaction experiences may be implemented in any of the ways described herein to provide various benefits and advantages as will be made apparent and/or be explicitly set forth herein. For instance, as one exemplary implementation of an immersive character interaction experience in accordance with principles described herein, a character interaction system will be considered. The character interaction system may be located at a first site, and may receive character behavior data representative of captured behavior of a real-world performer (e.g., an actor, etc.) located at a second site. In some examples, the second site may be geographically separated from the first site, and the character behavior data may thus be transmitted from the second site to the first site by way of a network (e.g., a low latency network such as a 5G provider network implementing multi-access edge computing ("MEC") technologies to achieve ultra-low data transmission latencies).

Based on the character behavior data received over the network, the character interaction system at the first site may present a representation of a virtual character avatar to an interactive user at the first site. For example, the virtual character avatar may be configured to perform, in real-time synchrony with the real-world performer at the second site, the captured behavior of the real-world performer. Additionally, during the presenting of the representation of the virtual character avatar to the interactive user, the character interaction system may provide user video data (e.g., data representative of captured behavior of the interactive user) for presentation to the real-world performer at the second site. This mutual exchange of behavior data may allow the real-world performer to interact, via the virtual character avatar, with the interactive user in real time. For example, the virtual character avatar may be an animated character who is animated, in real time, to mirror the body movements of the real-world performer and to speak the words of the real-world performer in a manner that allows the interactive user to perceive that he or she is having an interactive experience (e.g., a conversation, etc.) with the virtual animated character.

Moreover, the character interaction system may further be configured to generate an augmented representation of the interaction between the virtual character avatar and the interactive user. This augmented representation may be configured not necessarily for the real-world performer or the interactive user (although these people may see the augmented representation as well in certain implementations), but, rather, for presentation to a non-interactive observer who is distinct from the interactive user. For example, another person at the first site or at a different (e.g., third) site may watch the interactive user interacting with the virtual character avatar in a way that augments the experience even beyond what is experienced by the interactive user. For instance, the virtual character avatar may be shown in the augmented representation to emerge from the screen into the real world with the interactive user. In this way, both the interactive user and the non-interactive observer may enjoy an immersive, unique, and memorable experience related to the virtual character avatar.

Immersive character interaction experiences described herein are highly immersive for interactive users and non-interactive observers alike. One reason for this is that virtual character avatars that are animated and/or otherwise rendered in real-time on a screen (e.g., a video wall, etc.) can do many things that are not possible for a real person in a real-world costume to do as a result of constraints associated with available physical materials, real-world physics, and so forth. For instance, virtual character avatars may be implemented by animation styles that match expected animation styles for the character (e.g., including hand-drawn or computer-generated imagery ("CGI") animation styles), may perform behaviors such as flying through the air, growing to a different size, becoming translucent, moving within a virtual world in ways that would not be possible or practical for a costumed person to do in the physical world, and various other such behaviors.

Other advantages and benefits that arise from methods and systems described herein may include low-latency data transport technologies that may allow for the real-world performer, the interactive user, and the non-interactive observer to all be located at different sites (e.g., different buildings in different locales, etc.) while a single character interaction experience happens in real time for all of them. For example, this may allow the interactive user to be located at a site where he or she can fully enjoy the character interaction experience (e.g., an event such as a party, a conference, etc.), while the real-world performer may be acting on a stage at a studio site across town (e.g., rather than in a cramped trailer or backroom at the party) and non-interactive observers may be at other convenient locations (e.g., watching on monitors posted elsewhere at the event, watching on a device at home or another location, etc.).

Another significant benefit is that non-interactive observers may observe a particularly immersive version of the character interaction experience due to the application of extended reality technologies that allows for the experience to not be limited to the screen in front of the interactive user. In this way, the interactive user is not the only person who can enjoy the immersiveness of the character interaction experience, but the non-interactive observer also may enjoy an immersive and unique experience. As a result, interactive users and non-interactive observers alike may enjoy immersive character interaction experiences, and content creators and actors may benefit from having increased flexibility to generate high-quality and uniquely creative content.

Various embodiments will now be described in more detail with reference to the figures. The disclosed methods and devices may provide one or more of the benefits mentioned above and/or various additional and/or alternative benefits that will be made apparent herein.

FIG. 1 illustrates an exemplary character interaction system 100 ("system 100") for creating an immersive character interaction experience according to principles described herein. System 100 may be implemented by computer resources disposed at a first location (e.g., an event location in certain examples), by a multi-access server (e.g., a MEC server, a cloud server, etc.) configured to interoperate with computer resources disposed at the first location, or by any other suitable computing resources (e.g., servers, processors, memory devices, storage devices, etc.) as may serve a particular implementation.

As shown, system 100 may include, without limitation, a storage facility 102 and a processing facility 104 selectively and communicatively coupled to one another. Facilities 102 and 104 may each include or be implemented by hardware and/or software components of a suitable computing system (e.g., processors, memories, communication interfaces, instructions stored in memory for execution by the processors, etc.). In some examples, facilities 102 and 104 may be distributed between multiple devices and/or multiple locations as may serve a particular implementation. Each of facilities 102 and 104 within system 100 will now be described in more detail.

Storage facility 102 may store and/or otherwise maintain executable data used by processing facility 104 to perform any of the functionality described herein. For example, storage facility 102 may store instructions 106 that may be executed by processing facility 104. Instructions 106 may be executed by processing facility 104 to perform any of the functionality described herein. Instructions 106 may be implemented by any suitable application, software, code, and/or other executable data instance. Additionally, storage facility 102 may also maintain any other data accessed, managed, used, and/or transmitted by processing facility 104 in a particular implementation.

Processing facility 104 may be configured to perform (e.g., execute instructions 106 stored in storage facility 102 to perform) various functions associated with creating an immersive character interaction experience in any of the ways described herein. For example, processing facility 104 may be configured to receive character behavior data representative of captured behavior of a real-world performer. In some examples, processing facility 104 may receive the character behavior data while system 100 is located at a first site and the real-world performer is located at a second site geographically separated from the first site. For instance, the first site may be an event site such as a venue where a party event, a conference event, a sporting event, a concert event, an exposition or exhibition ("expo") event, or another suitable event is taking place, while the second site may be a studio site where a stage and various capture equipment is set up for real-world performers to perform (e.g., act and otherwise behave in a manner that embodies a character). In these examples, the first and second sites may be geographically separated by significant distances such as several miles (e.g., in a different part of the same city) or more (e.g., across the country or further). As such, the character behavior data may be transmitted from the second site to the first site by way of a network that, as will be described in more detail below, may support very low-latency data transport to allow the character interaction experience to be carried out in real time as if the interactive user and the real-world performer are both present at the same location.

Processing facility 104 may present a representation of a virtual character avatar to an interactive user at the first site. For example, as will be described in more detail below, the representation may be presented on a large or small screen (e.g., a video wall that is large enough for the virtual character avatar to be presented at full, life size) and the virtual character avatar may be made to perform (e.g., by way of real-time animation or other real-time image rendering) the captured behavior of the real-world performer in real-time synchrony with the real-world performer at the second site. During this presentation of the virtual character avatar to the interactive user, processing facility 104 may also capture (or otherwise access) and provide user video data representative of captured behavior of the interactive user. By providing the user video data to the second site, systems at the second site may present the user video data to the real-world performer, thereby allowing the real-world performer to see the interactive user as the interactive user interacts with the character. In this way, the real-world performer may interact, via the virtual character avatar, with the interactive user in real time.

In certain implementations, processing facility 104 may also generate an augmented representation of an interaction between the virtual character avatar and the interactive user for presentation to a non-interactive observer distinct from the interactive user. For example, the augmented representation may depict that the virtual character avatar emerges from a virtual world into the real world with the interactive user (rather than appearing to remain "inside" the screen in the virtual world, as perceived by the interactive user) or that other interplay between elements from the real and virtual worlds are taking place (e.g., interplay not perceived by the interactive user unless the interactive user also observes the augmented representation).

As has been mentioned, immersive character interaction experiences created by methods and systems described herein may be shared by various people in various places. For example, one or more interactive users at the first site, one or more real-world performers at the second site, and one or more non-interactive observers at the first or second sites or an additional third site all may take part in the same immersive character interaction experience at the same time. As used herein, operations described as being performed by an implementation of system 100 (or components thereof, related systems coupled to system 100, etc.) in "real time" will be understood to be performed in a manner that implements a shared character interaction that is experienced concurrently by people at multiple locations, as described above. For example, by operating in real time (i.e., by performing various operations described herein in real time), system 100 may provide, receive, process, and/or use data described herein (e.g., character behavior data, user video data, representations of virtual character avatars and worlds, augmented representations and augmented graphics included therein, etc.) immediately as the data is generated, updated, changed, exchanged, or otherwise becomes available. As a result, system 100 may be configured to continuously create an immersive character interaction experience based on relevant, real-time data so as to allow interactive users and non-interactive observers to have the immersive types of experiences described herein.

Accordingly, as used herein, operations or events that are described as occurring "in real time" or "in real-time synchrony" with other operations or events will be understood to be performed immediately, without undue delay, and near in time to the other operations or events, even if it is not possible for there to be absolutely zero delay or perfect synchronization. For example, if a real-world performer performs an action (e.g., lifting his or her arm, speaking a word, etc.), a virtual character avatar may be said to perform an analogous action (e.g., lifting a body part corresponding to an "arm," speaking the same word in the character's voice, etc.) in real-time synchrony with the real-world performer if the analogous action is performed soon enough after the original action to allow the interactive user to naturally converse and/or otherwise interact with the virtual character avatar. For instance, the virtual character avatar performing the action in real-time synchrony with the real-world performer may perform the analogous action at the first site within about a few tens or hundreds of milliseconds after the action is performed by the real-world performer at the second site. As has been mentioned and will be described in more detail below, the real-time capabilities of character interaction systems and methods described herein may be enabled by low latency network technologies such as MEC technologies, 5G provider network technologies, and so forth.

Figure 2:
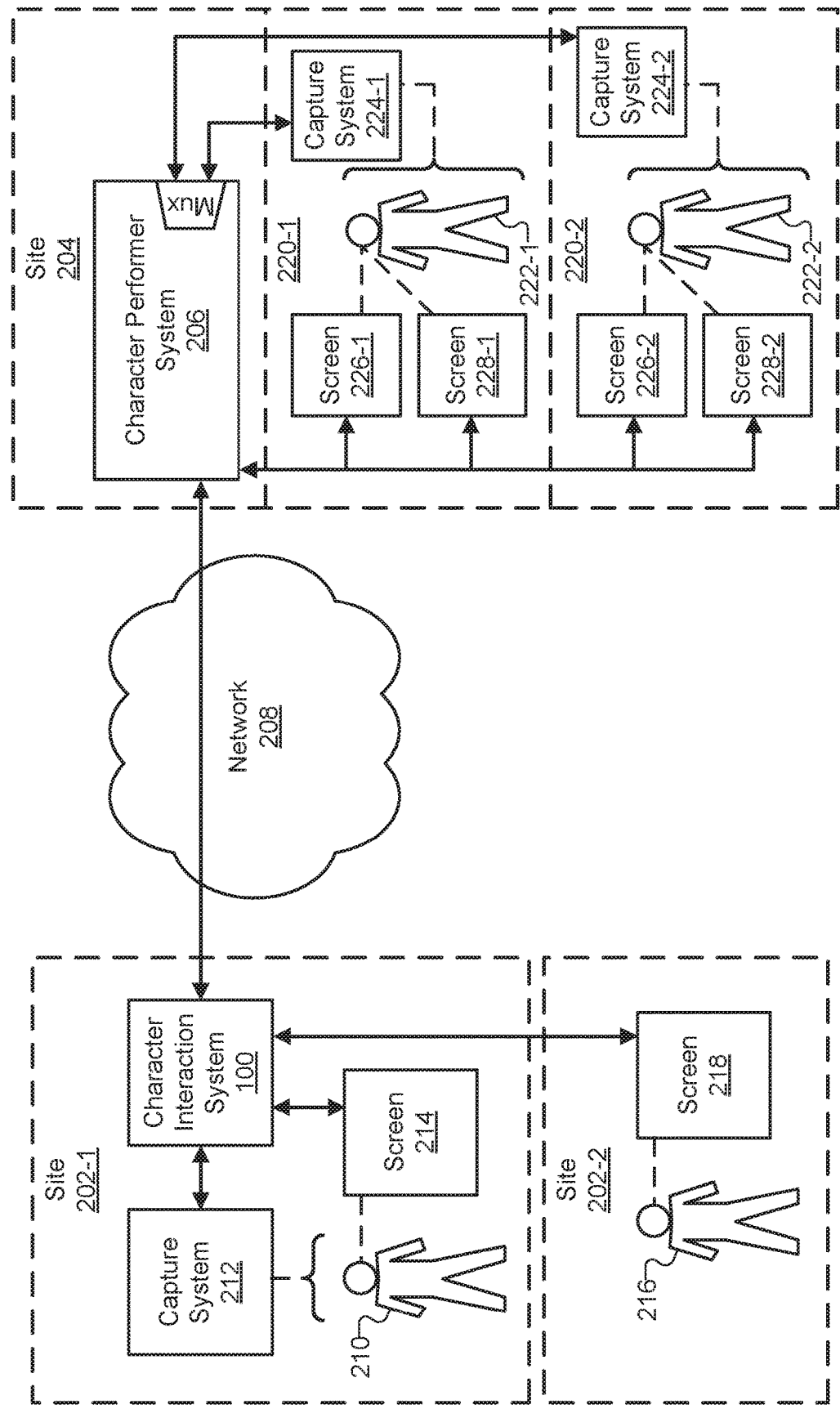
FIG. 2 illustrates an exemplary configuration in which the character interaction system of FIG. 1 operates to create the immersive character interaction experience according to embodiments described herein.

FIG. 2 illustrates an exemplary configuration 200 in which system 100 operates to create an immersive character interaction experience. As shown, in configuration 200, system 100 is located at a first site 202-1 that is distinct from a second site 204 where a character performer system 206 is located. System 100 and character performer system 206 are shown to be communicatively coupled to one another via a network 208 to allow for low-latency, inter-location (cross-site) communication.

Configuration 200 also shows an interactive user 210 at site 202-1, as well as a capture system 212 and a screen 214 associated with interactive user 210. At a site 202-2 (which may be the same as or related to site 202-1 in certain examples), configuration 200 also shows a non-interactive observer 216 and a screen 218 associated with non-interactive observer 216.

At site 204, configuration 200 includes a plurality of performance capture stages 220 (e.g., stages 220-1 and 220-2), each of which is shown to be associated with at least one respective real-world performer 222 (e.g., real-world performers 222-1 and 222-2), a respective performance capture system 224 (e.g., capture system 224-1 and 224-2), a respective screen 226 (e.g., screens 226-1 and 226-2), and a respective screen 228 (e.g., screens 228-1 and 228-2). System 100 has been described in some detail above. The operation of system 100 in configuration 200, as well as each of the other elements of configuration 200, will now be described in more detail.

Site 202-1 corresponds to the "first site" that has been described above as the location of system 100, or at least some of the computing resources that implement system 100 and perform the operations thereof (as mentioned above, in certain implementations, at least some operations of system 100 may be performed off-site such as at a MEC server integrated within network 208 or the like). In some examples, site 202-1 may be the venue of an event such as any of the events that have been described herein (e.g., party events, sporting events, expo events, etc.). In other examples, site 202-1 may not be associated with any event in particular, but may be at a location such as a home of interactive user 210, a store, a school, a museum, or any other indoor or outdoor location as may serve a particular implementation.

Site 204 corresponds to the "second site" that has been described above as the location at which character behavior data of a real-world performer is captured. Site 204 may be geographically separated from site 202-1 by at least some degree so as to implement a distributed character interaction experience (i.e., an immersive character interaction experience generated using distribute computing resources). In some examples, as has been mentioned, the first and second sites (i.e., sites 202-1 and 204) may be geographically separated by significant distances of many miles. While various elements are all shown to be included at a single site 204, it will be understood that these elements may, in certain implementations, be distributed at multiple locations (e.g., multiple locations that are all geographically separated from site 202-1). For example, site 204 may be distributed to multiple locations (e.g., one for each stage 220 and the elements included therein).

Data transport between system 100 and character performer system 206 is accomplished by way of network 208. Network 208 may be implemented by or include any type of communications network as may serve a particular implementation. For example, network 208 may be implemented by a low-latency network that allows for the real-time performance elements that have been described above. Implementing this low-latency network, network 208 may include elements of provider-specific wired or wireless communications network (e.g., a cellular network used for mobile phone and data communications, a 5G network or network of another suitable technology generation, a cable or satellite carrier network, a mobile telephone network, etc.) operated and/or managed by a provider entity such as a mobile network operator (e.g., a wireless service provider, a wireless carrier, a cellular company, etc.). The provider of such a provider network may own or control all of the elements necessary to sell and deliver communications services to users, including radio spectrum allocation, wireless network infrastructure, back haul infrastructure, customer care, provisioning of devices, network repair for the provider network, and so forth.

In some examples, network elements external to such a provider network may be included within network 208. For example, network 208 may include elements of various interconnected networks that are outside of any provider network and outside the control of any provider of such a provider network. Elements of the Internet, a wide area network, a content delivery network, and/or any other suitable network or networks are examples of other elements that may be included within network 208. Any of these provider or non-provider networks or network elements may provide data delivery between site 202-1 and site 204, and may implement or employ any suitable communication technologies, devices, media, protocols, or the like as may serve that end in a particular implementation. In some examples, network 208 may include multiple paths for data transport, such as a main communication path and a redundant communication path that can be employed if the main communication path is interrupted or slowed down so as to be inadequate for maintaining real-time communications.

At site 202-1, interactive user 210 is shown to be associated with screen 214, which is communicatively coupled with system 100. Interactive user 210 will be understood to represent one or more people who are interacting with one or more virtual character avatars controlled by one or more real-world performers 222. To this end, screen 214 may be viewed by interactive user 210 and may be used by system 100 to present the virtual character avatar. Screen 214 may be implemented by any type of display that is capable, using any suitable type of display technology, of displaying a virtual character avatar and, in some examples, a virtual world that the virtual character avatar inhabits. In certain implementations, screen 214 may be implemented by a relatively large screen or array of screens configured to act as a single screen (e.g., a video wall). In other implementations, screen 214 may be implemented by a smaller screen such as a computer monitor, a screen of a mobile device, or the like. Screen 214 may be implemented by a display screen that emits light directly to a user using light-emitting diodes (an "LED" screen) or another suitable technology, by a projector that projects light onto a reflective screen, or by any other display technology as may serve a particular implementation.

The content that system 100 presents to interactive user 210 using screen 214 may be generated based on character behavior data that system 100 receives from character performer system 206 by way of network 208. Just as system 100 is understood to incorporate many or all of the computing resources used at site 202-1 to create the immersive character interaction experience, character performer system 206 will be understood to perform a similar role for site 204. That is, character performer system 206 may include or by implemented by computing resources of one or more servers or other computing systems located at site 204 and configured to facilitate the operations described below as being performed at site 204.

Character performer system 206 may be associated with various performance capture stages 220, each of which may be located locally or remotely from site 202-1. As shown, each stage 220 may include the same elements. In this way, a continual stream of character behavior data may be generated even when certain real-world performers 222 associated with one stage 220 are unavailable. For example, a multiplexor (labeled "Mux" in FIG. 2) implemented by character performer system 206 may allow for captured data from one multiple capture system 224 of a plurality of such systems to be selected at a time. As such, data associated with stage 220-1 (i.e., data provided by capture system 224-1 and corresponding to real-world performer 222-1) may be selected while real-world performer 222-1 is actively performing, then, when real-world performer 222-1 ceases performing (e.g., to go on a break, at the end of a shift, etc.), data associated with stage 220-2 (i.e., data provided by capture system 224-2 and corresponding to real-world performer 222-2) may be selected without any interruption to the character behavior data stream.

In this way, the character behavior data received by system 100 from character performer system 206 may originate, at different times, from a first character behavior data stream representative of the captured behavior of real-world performer 222-1 and from a second character behavior data stream representative of additional captured behavior of real-world performer 222-2. The receiving of this character behavior data may proceed uninterrupted when a transmission of the first character behavior data stream is switched (e.g., using the multiplexor switch of character performer system 206) to a transmission of the second character behavior data stream. Accordingly, a steady sequence of different interactive users 210 (e.g., a long line of people at a party, etc.) may take turns interacting with a virtual character avatar without requiring any single actor or other real-world performer 222 to work an arbitrarily long and continuous shift, and without the virtual character avatar needing to "take a break" or go offline. Indeed, in examples where the virtual character avatar has a different appearance and a modified voice from the real-world performer, it may not be easy or possible for interactive users 210 to even discern when one real-world performer is switched out for another with respect to controlling a particular virtual character avatar.

In certain examples, each real-world performer 222 may represent one or more actors whose behaviors are captured by the respective capture system 224. For example, when the actor gestures with his or her arms, takes a step, turns his or her head, speaks, jumps, or performs any other such body motion or behavior, data representative of the motion or behavior is generated by the respective capture system 224 and provided in a stream to character performer system 206, which transmits the character behavior data to system 100 at site 202-1. In some examples, a real-world performer 222 may not be an actor and may not be playing a role, but, rather, may be communicating with interactive user 210 as himself or herself. In this type of example, the virtual character avatar may take the true form of the person acting as the real-world performer 222, rather than the form of an animated or other character distinct from the real-world performer 222.

Each capture system 224 may include any capture devices and/or other equipment (e.g., computing devices, etc.) as may serve a particular implementation. For example, capture systems 224 may each include video capture equipment (e.g., one or more video cameras), audio capture equipment (e.g., one or more microphones), motion capture equipment (e.g., trackable markers worn by actors and capture devices configured to track the markers), depth capture equipment (e.g., time-of-flight depth capture devices, etc.), and/or any other such equipment that may capture or facilitate capture of character behavior data. In some examples, capture system 224 may further include computing resources such as video and audio processing hardware and software, motion capture hardware and software for translating captured video into motion data, or the like, while, in other examples, such computing tasks may be performed by character performer system 206.

Using whichever systems, devices, and other resources are employed for a particular implementation, each capture system 224 may be configured to monitor the behavior of the respective real-world performer(s) 222 as he or she or they perform various actions on a particular stage 220. Based on this monitored behavior, capture systems 224 generate character behavior data or provide data to character performer system 206 that character performer system 206 may use to generate the character behavior data.

Character behavior data may thus be understood to represent the behavior (e.g., body motions, facial expressions, etc.) of one or more real-world performers 222 in a form that is usable by system 100 to animate or otherwise give life to a virtual character avatar presented to interactive user 210 on screen 214. To this end, character behavior data may take any form as may serve a particular implementation. For instance, in certain implementations, character behavior data may include motion data (or other metadata) that is representative not of video imagery but, rather, of motion vectors for behaviors that the one or more real-world performers 222 have been detected to perform. In some examples, such motion vectors may be associated with the movement of markers placed at various points on the body or costume of the real-world performers 222 to facilitate motion tracking of various body parts, facial muscles, and so forth. In the same or other implementation, character behavior data may include video image data and/or depth data from which motion of the real-world performers 222 may be derived.

In some examples, audio capture devices, such as microphones, included within each capture system 224 may be placed on their respective stage 220 or attached or held above real-world performers 222 so as to be positioned to capture speech and/or other sound made by real-world performer 222. Capture systems 224 and/or character performer system 206 may pass this captured audio through to system 100 without modification in certain examples, or, in other examples, these systems may apply various filters and/or other audio processing to modify the voices of respective real-world performers 222 to better implement desired characteristics of the voice of the virtual character avatar that is to be presented to interactive user 210 as speaking the words. For example, if a virtual character avatar is a lighthearted cartoon character, filters may be used to make speech of a corresponding real-world performer 222 sound high-pitched, while, if the virtual character avatar is a serious character such as a villain, different filters may be used to make the speech sound deeper and more severe.

In certain examples, captured behavior of certain real-world performers 222 may only (or largely) consist of physical movements, expressions, and behaviors, while audible behaviors (e.g., speech, sound effects, etc.) may be controlled by other real-world performers 222 or other personnel (e.g., stage directors, etc.) associated with the same stage 220 and capture system 224. Moreover, as will be described in more detail below, real-world performers 222 or the other personnel associated with a given stage 220 at site 204 may cause character behavior data to be generated in ways other than physical movements, expressions, sounds, and behaviors. For example, certain actions may be performed to indicate a request for what is referred to herein as "non-performed behavior" (i.e., a behavior that a virtual character avatar is directed to perform not by mirroring movement or other behavior of the real-world performer but by an action that is different from the behavior). Actions used to request non-performed behaviors may include pressing a particular button, speaking a voice command, performing a hand gesture, or the like. Character behavior data indicative that a non-performed behavior has been requested may be generated and included in the stream of character behavior data being generated by the capture system 224. As used herein, and as will be described in more detail below, non-performed behaviors refer to actions that may be desirable (and completely reasonable) for a virtual character avatar to perform, but that may not desirable, convenient, and/or, in some cases, possible for a real-world performer 222 to perform. For example, non-performed behaviors may include flying, bursting into flames, falling into a pit, disappearing (e.g., turning invisible), shrinking or growing to a different size, splitting into two halves, and so forth.

Similarly, character behavior data may be made to include (e.g., based on a manual indication by a real-world performer 222 or stage director, etc.) vectors for controlling objects in a virtual world other than the virtual character avatar. For example, by pressing a button or performing a hand gesture, character behavior data may be generated to indicate that a door or curtain should open (e.g., at the beginning of a character interaction experience of a particular interactive user 210) or close (e.g., at the end of the character interaction experience), that an object or other virtual character avatar in the virtual world should perform a particular action, or the like.

Each screen 226 may be configured as a reference monitor to allow real-world performers 222 to have visibility into an ongoing character interaction experience. For example, character performer system 206 may be configured to mirror the processing performed by system 100 to animate and give life to the virtual character avatar so that each real-world performer may see the same virtual representation of the virtual character avatar and the virtual world as interactive user 210 sees during the immersive character interaction experience. Additionally or alternatively, screen 226 may display a representation of capture data generated by capture system 224 (e.g., live video of real-world performers 222, a representation of motion capture data, etc.) in any manner as may facilitate the performance of real-world performers 222 during a particular immersive character interaction experience.

Each screen 228 is also configured to facilitate the performance of the real-world performers 222 during the immersive character interaction experiences, but, rather than presenting feedback about the real-world performers themselves or the virtual character avatars and virtual worlds they are controlling, screen 228 may be configured to present user video data representative of captured behavior of interactive user 210.

At site 202-1, capture system 212 may be similar or the same as capture systems 224, but may be configured to capture behavior data associated with interactive user 210, rather than the character behavior data associated with real-world performers 222 that has been described. Behavior data associated with interactive user 210 is referred to herein as user video data and will be understood to representative of captured behavior (e.g., video, audio, etc.) of interactive user 210 during an immersive character interaction experience. Because, in many examples, interactive user 210 is not in a studio environment (such as that of stages 220) but, rather, may be at a party or other event environment, capture elements of capture system 212 such as video cameras, microphones, and so forth, may be hidden within set pieces associated with screen 214. Examples of such set pieces will be described and illustrated in more detail below.

It will be understood that, while the focus of capture systems 224 may be to generate motion data for animating a virtual character avatar, the focus of capture system 212 may be on generating video data (e.g., including visual and audio data) for direct presentation to real-world performers 222 on respective screens 228. This is because, unlike interactive user 210, who may only be presented with an image of the virtual character avatar and not the real-world performers 222, it may be desirable for real-world performers 222 to see interactive users 210 as they actually appear. In this way, real-world performers 222 may instruct interactive users 210 to do certain things (e.g., "Step forward! Come on, don't be shy . . . "), may comment on the appearance of interactive users 210 (e.g., "Let's hear from the gentleman in the red bow tie. What are your thoughts?"), and may converse and otherwise interact with interactive users 210 in natural, meaningful, and/or collaborative ways.

Non-interactive observer 216 and screen 218 are shown at yet another site, labeled site 202-2. Site 202-2 is given a related reference number to site 202-1 because, in certain examples, site 202-1 and 202-2 may be the same site ("site 202") or different parts of the same site (e.g., different rooms in the same building, different areas at an event venue, etc.). For example, if an expo event includes a booth where attendees may take turns in the role of interactive user 210 having immersive character interaction experiences with a virtual character avatar, displaying one or more screens 218 around the expo hall (e.g., at the entrance, in an eating area, etc.) may entice other attendees to stop by the booth to have their own immersive character interaction experience. As such, non-interactive observers 216 will be understood to represent various people who may view an augmented representation of an interaction between a virtual character avatar and an interactive user 210 but who are not necessarily currently part of the interaction or even in a location where they can witness the interaction in any way other than on screen 218.

In other examples, non-interactive observer 216 and screen 218 may represent other ways that various people may view immersive character interaction experiences in various locations. For example, the entity providing immersive character interaction experiences at the exemplary expo event described above may provide video data (e.g., a souvenir DVD, etc.) to interactive users 210 who have an immersive character interaction experience at the event. Accordingly, in this example, a non-interactive observer 216 may be understood to have previously acted as an interactive user 210, screen 218 may be a television screen or other device used by the non-interactive observer 216, and site 202-2 may be the home of the non-interactive observer 216, or any other location where the non-interactive observer 216 may choose to view the recorded augmented representation. Various details about augmented representations will be described and illustrated in more detail below.

Figure 3:
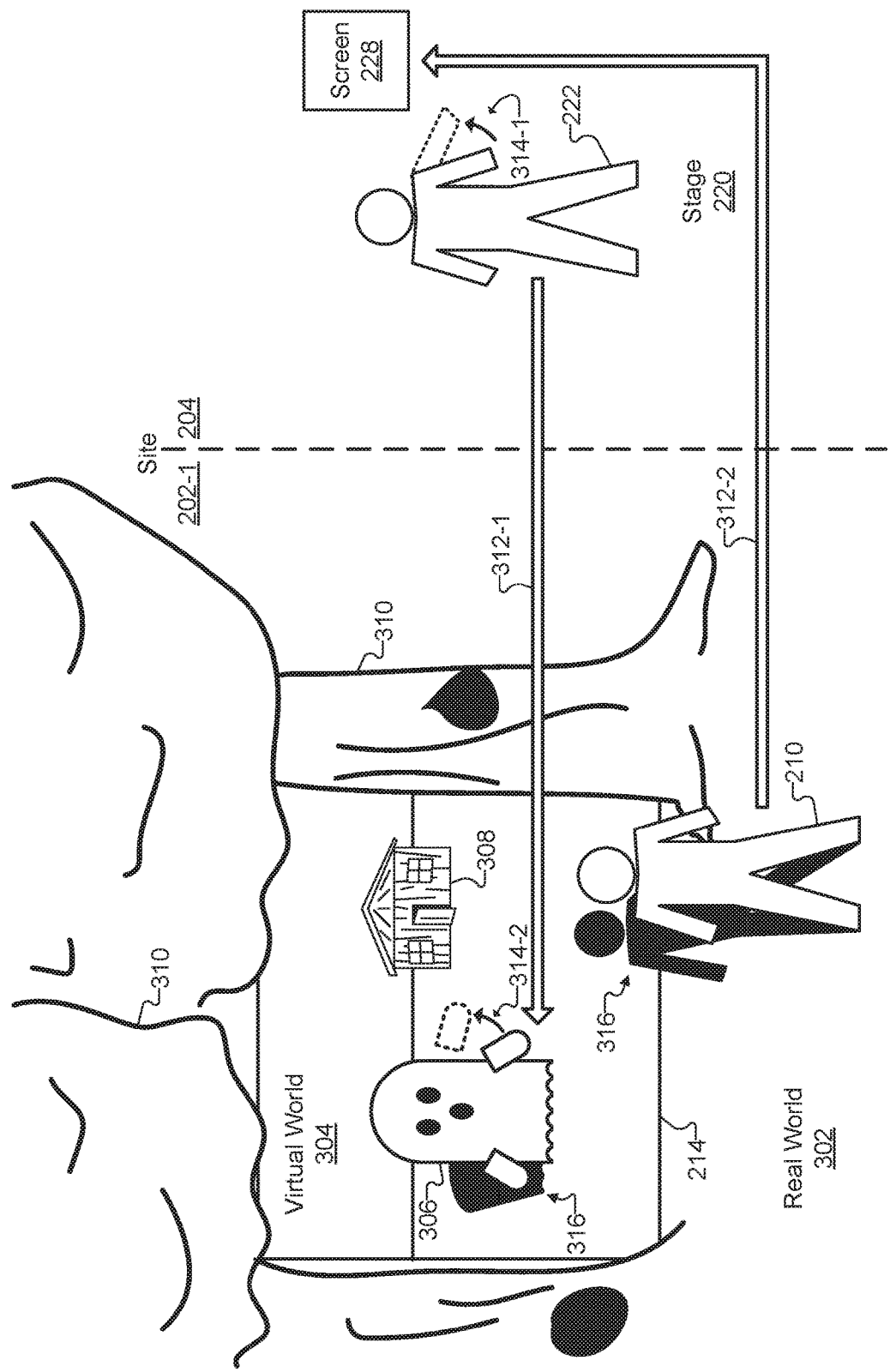
FIG. 3 illustrates an exemplary immersive character interaction experience according to embodiments described herein.

FIG. 3 illustrates an exemplary immersive character interaction experience 300 that may be created by a character interaction system such as system 100 when in a configuration such as configuration 200. As such, certain elements of configuration 200 are depicted in FIG. 3 along with several additional elements not explicitly shown in configuration 200 to illustrate immersive character interaction experience 300. For example, interactive user 210 is shown at site 202-1 to be viewing a presentation on screen 214, while a real-world performer 222 viewing a screen 228 is shown to be located on a performance capture stage 220 at site 204. Other elements of configuration 200 that are not explicitly illustrated in FIG. 3 may still be understood to be present in certain implementations.

New elements illustrated by FIG. 3 include a distinction between a real world 302 and a virtual world 304 at site 202-1, a virtual character avatar 306 and a virtual object 308 included within virtual world 304, various set pieces 310 in real-world 302 at site 202-1, an exchange of behavior data 312 including character behavior data 312-1 and user video data 312-2, mirrored behaviors 314 of real-world performer 222 (behavior 314-1) and of virtual character avatar 306 (behavior 314-2), and simulated lighting effects 316 in which light from real world 302 is accounted for in virtual world 304. The elements explicitly shown in configuration 200 have been described in detail above, and the additional elements illustrated for the first time in FIG. 3 will now be described in more detail.

Real world 302 may refer to the real-world environment inhabited by interactive user 210, screen 214, set pieces 310, and so forth. To illustrate immersive character interaction experience 300, FIG. 3 shows various real-world objects at site 202-1 including everything at site 202-1 besides what is depicted on the video wall of screen 214. Accordingly, it will be understood that real world 302 may include any real person or object in the real-world environment, as opposed to virtual character avatars and/or objects that exist only virtually in virtual world 304.

On screen 214, virtual world 304 is depicted to include at least one virtual character avatar (i.e., virtual character avatar 306) and at least one virtual object (i.e., virtual object 308). In this particular example, virtual character avatar 306 is shown to be presented as a ghost character that has a distinct appearance from an appearance of real-world performer 222 (whose captured behavior virtual character avatar 306 performs, as will be described in more detail). In similar examples, virtual character avatar 306 may be presented as any type of character described herein, including animated and live-action characters, fictional and non-fictional characters, imaginary and real characters, living and dead characters, and so forth. In any of these examples, as in the example illustrated in FIG. 3, virtual character avatar 306 may have a distinct appearance from that of real-world performer 222 (i.e., may not be made to resemble real-world performer 222 but merely to mirror the behaviors of real-world performer 222). Additionally, in certain examples, a virtual character avatar 306 may be implemented that resembles real-world performer 222 in certain respects (e.g., a facial resemblance, etc.) or in every respect (e.g., virtual character avatar 306 may be implemented by a video image of real-world performer 222, who may be dressed in a costume to act a role or may be dressed as himself or herself). For instance, such an example may be employed in a video communications application or the like.

Together with virtual character avatar 306 in virtual world 304, one or more virtual objects may also be presented on screen 214. For instance, as shown in FIG. 3, a haunted house associated with the universe of the ghost character implementing virtual character avatar 306 may serve as an example of one type of virtual object 308. In other examples, various other objects associated with this virtual universe of virtual character avatar 306 (or another virtual universe of another virtual character avatar) may also be presented as being part of virtual world 304. Such objects may be real-world objects that are held or worn by real-world performer 222 and captured on stage 220, or may be virtual objects that are integrated into virtual world 304 by system 100.

As shown in FIG. 3, immersive character interaction experience 300 may be especially immersive when screen 214 is a large screen that is made to blend in (e.g., using set dressing and other decoration) with the surroundings of real world 302. For example, the representation of virtual character avatar 306 may be presented to interactive user 210 on a video wall that implements screen 214 and that is sized and integrated into a real-world environment such that the representation of virtual character avatar 306 to interactive user 210 is an actual-size representation configured to simulate virtual character avatar 306 being present in real world 302. If the ghost character of virtual character avatar 306 is supposed to be approximately the same size as a human adult, for example, the video wall implementing screen 214 may be large enough to present virtual character avatar 306 as being approximately the same size as interactive user 210, to present virtual object 208 as being the size of an actual house in the distance, and so forth, as depicted in FIG. 3.

The immersive effect of making virtual world 304 appear life-size on a large screen (e.g., a video wall) is shown to be further heightened by making screen 214 blend into real world 302 using various set pieces 310 that are appropriate for the theme of virtual world 304. For example, for the spooky theme of virtual world 304, set pieces 310 may include old trees suggestive of a haunted forest or the like. As another example, if the virtual world were on a space station, the set pieces could be implemented as an airlock that could be opened and closed for each immersive character interaction experience with a new interactive user 210. In any case, as shown, set pieces 310 may frame screen 214 in a realistic and immersive manner that facilitates the suspension of disbelief in interactive user 210 and allows interactive user 210 to perceive that he or she is actually looking into virtual world 304, rather than merely viewing a representation of the virtual world on a screen.

Another benefit of set pieces 310 that has been mentioned is that set pieces 310 may provide discreet hiding places for elements of capture system 212. For example, one or more microphones and/or computing devices associated with capture system 212 and/or system 100 may be hidden within the trunks of the trees implementing set pieces 310, while overhanging branches of the trees may support inconspicuous capture devices (e.g., video cameras, microphones, etc.) used to capture user video data that can be used for the presentation of user video data to real-world performer 222 on screen 228 and for the augmented representation presented to non-interactive observer 216 on screen 218.

While not shown in FIG. 3, it will be understood that the area of real world 302 where immersive character interaction experience 300 is happening may include various other monitors or screens, set pieces, decorations, promotional content, and so forth. For example, one or more implementations of screen 218 may be located in the vicinity of immersive character interaction experience 300 to present the augmented representation of immersive character interaction experience 300 and to thereby enhance the experience of interactive user 210 and/or onlookers in the vicinity (e.g., family or friends of interactive user 210, people in line to have their own immersive character interaction experience as the interactive user, etc.).

Set pieces 310 may contribute to the immersiveness and enjoyability of immersive character interaction experience 300 by helping screen 214 to blend into the real-world environment of real world 302 and/or to serve as a virtual portal into virtual world 304. Additionally, the real-time interaction between interactive user 210 and virtual character avatar 306 may be characterized by various interaction properties that further contribute to the immersiveness of the experience.

For example, based on character behavior data 312-1, a real-time interaction between interactive user 210 and real-world performer 222 (who is interacting via virtual character avatar 306) may include a plurality of interaction properties such as a mutual observation interaction property, a non-performed behavior interaction property, a mutual conversation interaction property, a virtual manipulation interaction property, and/or any other interaction properties as may serve a particular implementation. A few exemplary interaction properties will now be described.

As used herein, a mutual observation interaction property may refer to a property of an interaction experience in which interactive user 210 observes virtual character avatar 306 performing behavior 314-2 (i.e., the behavior of raising up a right arm in this example) based on analogous behavior 314-1 as performed by real-world performer 222. This observation of behavior 314-2 by interactive user 210 may occur concurrently with real-world performer 222 observing (e.g., via screen 228 which presents user video data 312-2) interactive user 210 and any behaviors interactive user 210 may be engaging in. As such, an interaction experience characterized by a mutual observation interaction property may be an interaction experience in which the interactive user and the real-world performer may see the body motions of one another (with the virtual character avatar standing in as proxy for the real-world performer).

As used herein, a non-performed behavior interaction property may refer to a property of an interaction experience in which virtual character avatar 306 performs a non-performed behavior (i.e., as described above, a behavior that is initiated in a manner other than by being performed by real-world performer 222). For example, as mentioned above, certain implementations of virtual character avatar 306 may be configured to perform behaviors based on actions of real-world performer 222 (or a stage director associated with stage 220 and real-world performer 222) such as a press of a button, a special voice command or hand gesture, or another suitable action other than a performed behavior that is to be mirrored. As mentioned above, non-performed behaviors may include character behaviors that are not possible or practical to be performed by real-world performers, such as flying, changing size, and so forth.

Figure 4:
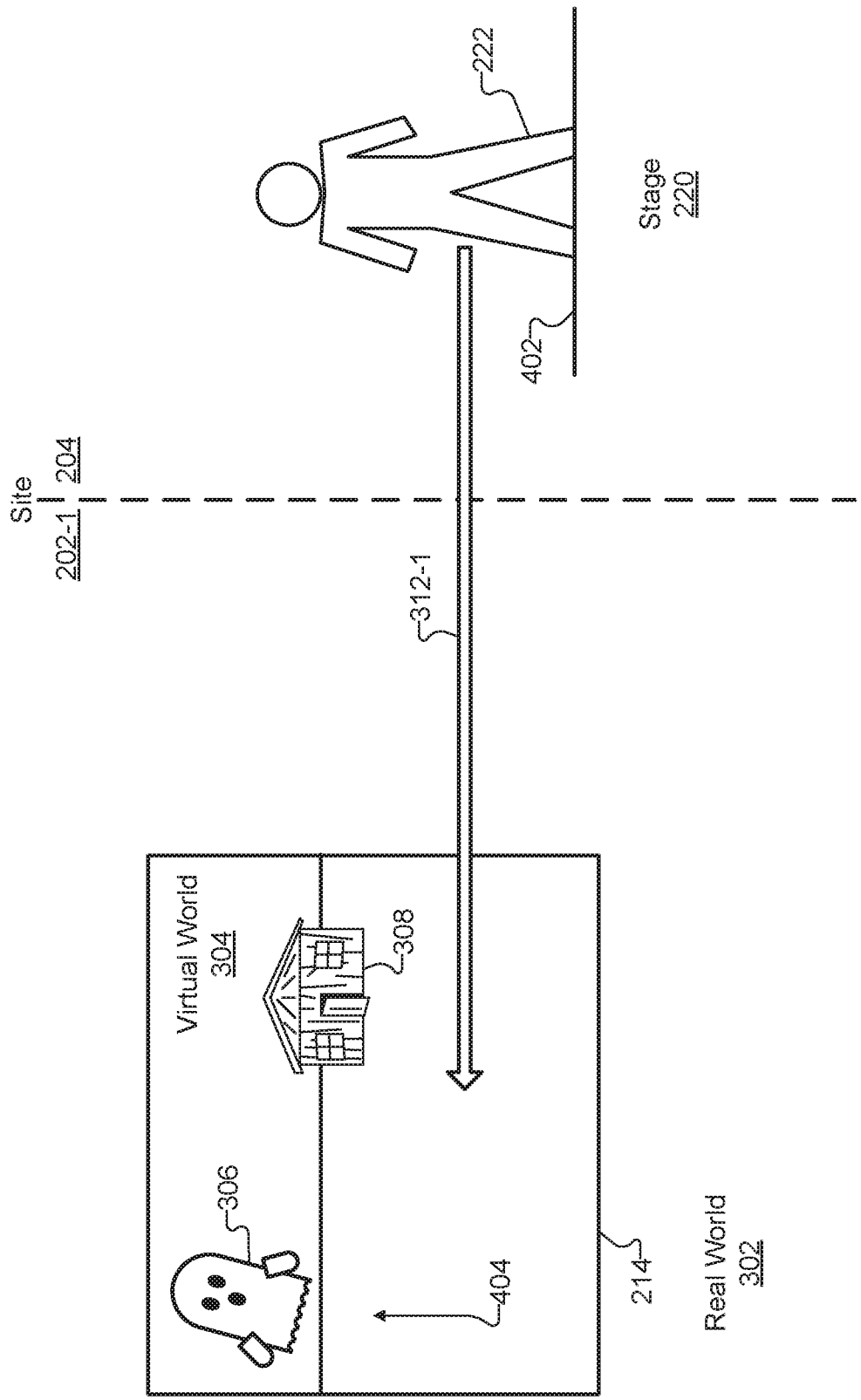
FIGS. 4-5 illustrates certain exemplary aspects of the immersive character interaction experience of FIG. 3 according to embodiments described herein.

To illustrate, FIG. 4 shows certain exemplary aspects of immersive character interaction experience 300 when character behavior data 312-1 includes a request for a non-performed behavior. Specifically, in this example, real-world performer 222 may have his or her feet planted firmly on a stage surface 402 (i.e., the ground) and may perform an action such as pressing a button to add a request for a non-performed behavior to character behavior data 312-1. As a result, a non-performed behavior 404 (i.e., flying up in the air in this example) is shown to be performed by virtual character avatar 306 in the presentation on screen 214.

Returning to FIG. 3, a mutual conversation interaction property, as used herein, may refer to a property of an interaction experience in which interactive user 210 hears virtual character avatar 306 speaking words spoken by real-world performer 222 (e.g., and received by system 100 as part of character behavior data 312-1) concurrently, in a half-duplex or full-duplex manner, with real-world performer 222 hearing words spoken by interactive user 210 to virtual character avatar 306 (e.g., and received by character performer system 206 as part of user video data 312-2). As such, an interaction experience characterized by a mutual conversation interaction property may be an interaction experience in which the interactive user and the real-world performer may engage in a conversation with one another (with the virtual character avatar standing in as proxy for the real-world performer).

As used herein, a virtual manipulation interaction property may refer to a property of an interaction experience in which, by performing a particular action, the interactive user 210 exerts a physical influence over virtual character avatar 306 or another virtual aspect of virtual world 304 inhabited by virtual character avatar 306 (e.g., a virtual object such as virtual object 308). For example, interactive user 210 may perform an action such as a press of a button, a special voice command or hand gesture, or another suitable action that is predefined, or naturally understood (e.g., by real-world performer 222, by a stage director associated with stage 220, etc.) to be intended, to exert a physical influence over virtual elements of virtual world 304.

Figure 5:
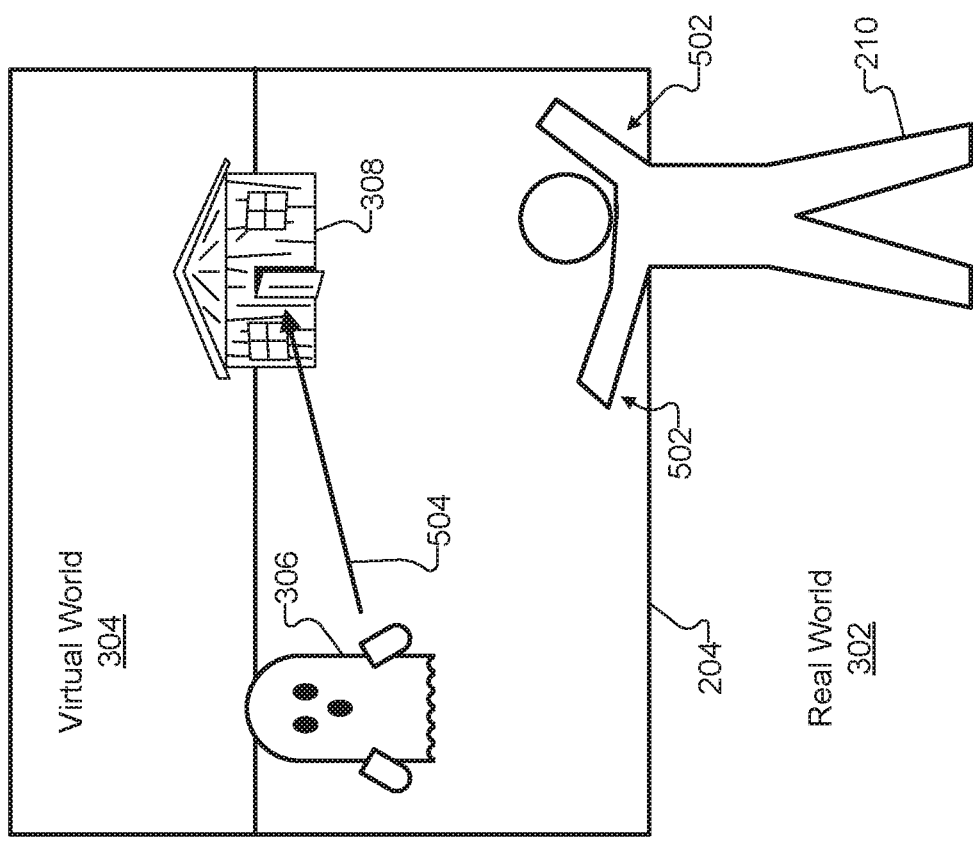

To illustrate, FIG. 5 shows additional exemplary aspects of immersive character interaction experience 300 when user video data 312-2 reflects an action 502 by interactive user 210 (e.g., a gesture involving raising the hands and arms in a particular way, etc.) that is predefined or otherwise indicative of an intent to exert a physical influence over things in virtual world 304. Specifically, in this example, interactive user 210 is shown to be performing action 502 in a way that exerts a physical influence 504 in virtual world 304. For instance, physical influence 504 is shown in FIG. 5 to include banishing the ghost character (virtual character avatar 306) back into the haunted house (virtual object 308). This may be done at the end of one particular immersive character interaction experience by one particular interactive user 210 before a next person in line takes a turn as the interactive user 210 and virtual character avatar 306 reemerges for the next immersive character interaction experience. In other examples, other gestures or actions by interactive user 210 may exert physical influence on any virtual character avatar, virtual object, or other aspect of the virtual world in any manner as may serve a particular implementation. For example, other gestures by interactive user 210 may cause virtual object 308 to levitate in the air or collapse into a pile of rubble, may cause virtual character avatar 306 to shrink or grow or explode, or may cause any other performed or non-performed behavior or action by any element of virtual world 304 as may comport with a theme of virtual world 304 and/or as may be included as part of the provided immersive character interaction experience.

Returning to FIG. 3, another immersive aspect of the representation to interactive user 210, along with various interaction properties that have been described above, is illustrated by simulated lighting effects 316. Specifically, as shown, the representation displayed on screen 214 may be configured to account for simulated lighting effects of real-world light that originates in real world 302 and virtually propagates into virtual world 304. In the illustrated example, for instance, real-world light may originate from behind interactive user 210 in real world 302 such that interactive user 210 casts a shadow forward toward screen 214. Under normal circumstances, this shadow may be changed or obscured by screen 214, thereby diminishing an immersive effect that the character interaction experience is attempting to recreate (i.e., that interactive user 210 is looking into an actual virtual world rather than looking at a screen). Therefore, in order to maximize the immersiveness of the experience, the representation may account for and display, as a simulated lighting effect 316, the shadow of interactive user 210 in a manner that bolsters the illusion that real-world light interacts with virtual world 304 in a natural way. Similarly, a shadow of virtual character avatar 306 simulated as being cast from the real-world light that is being accounted for within virtual world 304 is shown as another simulated lighting effect 316.

Simulated lighting effects 316 will be understood to illustrate just one example of how real-world light may be simulated as having an effect in virtual world 304. In other examples, the color and amount of real-world light that spills into virtual world 304 may similarly be simulated, a real or imaginary light source controlled by interactive user 210

(e.g., a flashlight, a laser gun, etc.) may be simulated as casting light (e.g., a flashlight beam, laser bullets, etc.) into virtual world 304, or the like.

Figure 6:
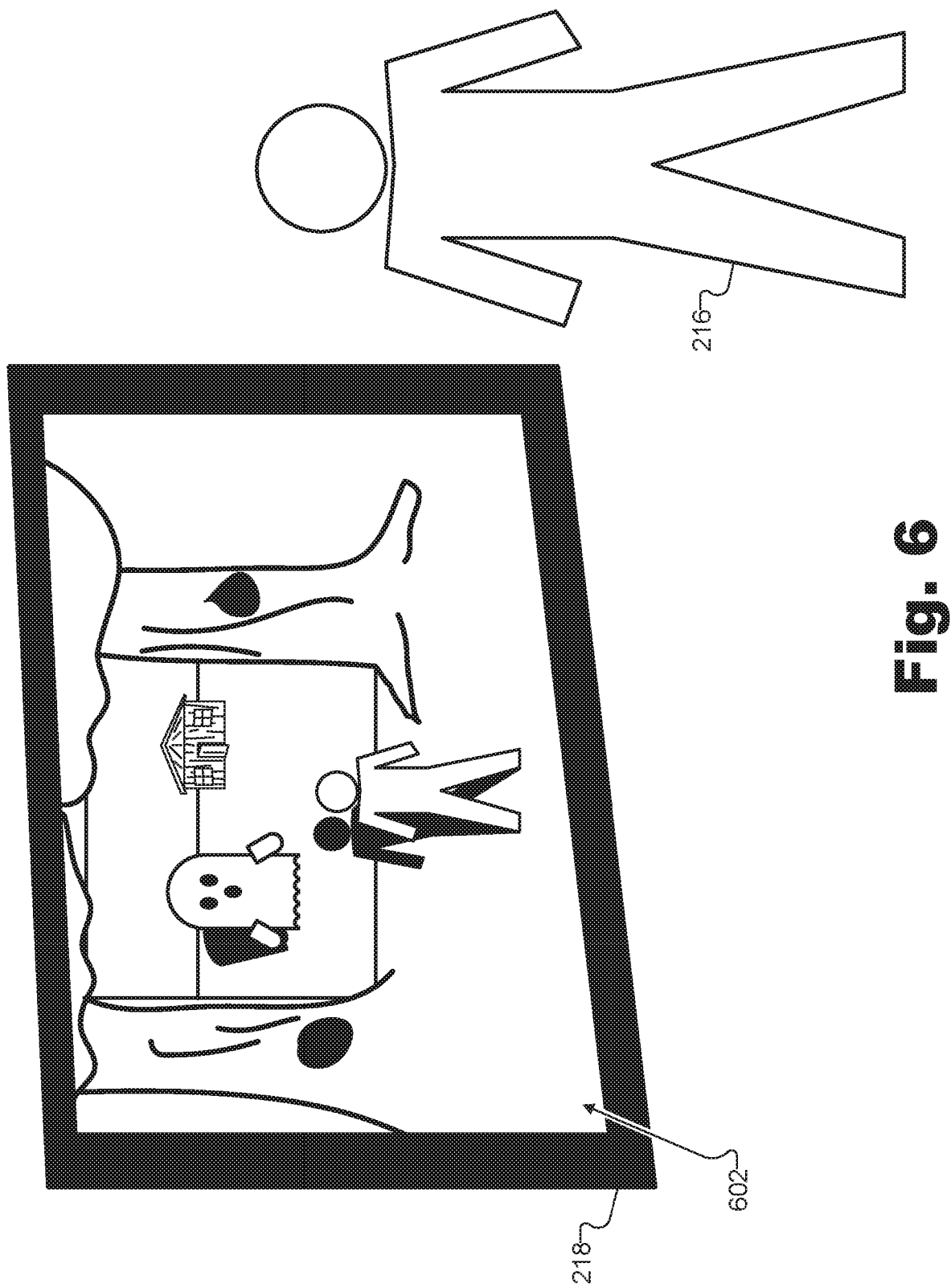
FIG. 6 illustrates an exemplary representation of an interaction between a virtual character avatar and an interactive user for presentation to a non-interactive observer according to embodiments described herein.

As was described above in relation to configuration 200, an augmented representation of an immersive character interaction experience may be presented to one or more non-interactive observers 216 viewing one or more screens 218. To illustrate, FIG. 6 shows an exemplary representation 602 presented on a screen 218 to a non-interactive observer 216. As shown, representation 602 depicts an interaction between a virtual character avatar (e.g., virtual character avatar 306) and an interactive user (e.g., interactive user 210). For example, the interaction depicted in representation 602 may be associated with immersive character interaction experience 300 described above in relation to FIGS. 3-5 or another suitable immersive character interaction experience.

Non-interactive observer 216 may be any observer of representation 602, including an interactive user who can see themselves on a monitor placed near the video wall, people nearby the interactive user during the immersive character interaction experience (e.g., companions of the interactive user, people waiting in line for an immersive character interaction experience or other onlookers, etc.), or people that are in a location other than the location where the immersive character interaction experience is occurring (e.g., people at another area of the event, people watching from a device at a different site, etc.). In some examples, representation 602 may be recorded (e.g., digitally recorded on a medium such as a souvenir DVD, etc.) and the viewing of representation 602 may take place in a time-shifted manner (e.g., after the interactive user has returned home) rather than, as is the case in other examples, live during the immersive character interaction experience.

In FIG. 6, representation 602 is shown to depict an immersive character interaction experience directly, without any augmentation to what the interactive user and/or other people watching the immersive character interaction experience see. Specifically, as shown, the virtual character avatar is shown to be inside the screen within the virtual world, the interactive user is shown to be outside the screen within the real world, and so forth. Accordingly, representation 602 may be generated using a direct (i.e., straight, non-augmented, unmodified, etc.) video capture of the site of the immersive character interaction experience as the experience occurs.

While the direct video capture of representation 602 may be interesting and useful in some ways and/or for some parts of an immersive character interaction experience, it may be even more immersive and engaging for non-interactive observer 216 to be presented with an augmented representation of the immersive character interaction experience. As used herein, an augmented representation of an interaction may refer to any representation that depicts certain aspects of the interaction as they actually occur (e.g., as would be captured by direct video capture, as would be experienced by the interactive user or an onlooker present for the immersive character interaction experience, etc.) while depicting other aspects of the interaction in a manner distinct from how they actually occur. As such, an augmented representation may use augmented reality, mixed reality, or other forms of extended reality technologies to impose an augmentation onto a direct video capture of an immersive character interaction experience (such as the direct video capture illustrated by representation 602).

In this sense of the word, it will be understood that a representation is not considered to be "augmented" merely as a result of an improved camera angle (e.g., a high camera angle that allows non-interactive observer 216 to have a better vantage point on the scene than onlookers present at the scene, etc.), a high quality video capture (e.g., video captured with a high resolution image or high fidelity sound), or the like. Rather, augmented representations referred to herein depict some aspect of the real world in a way that is distinct from what is actually captured by a video capture device and/or experienced by an observer witnessing an interaction directly (i.e., other than with the augmented representation).

Figure 7:
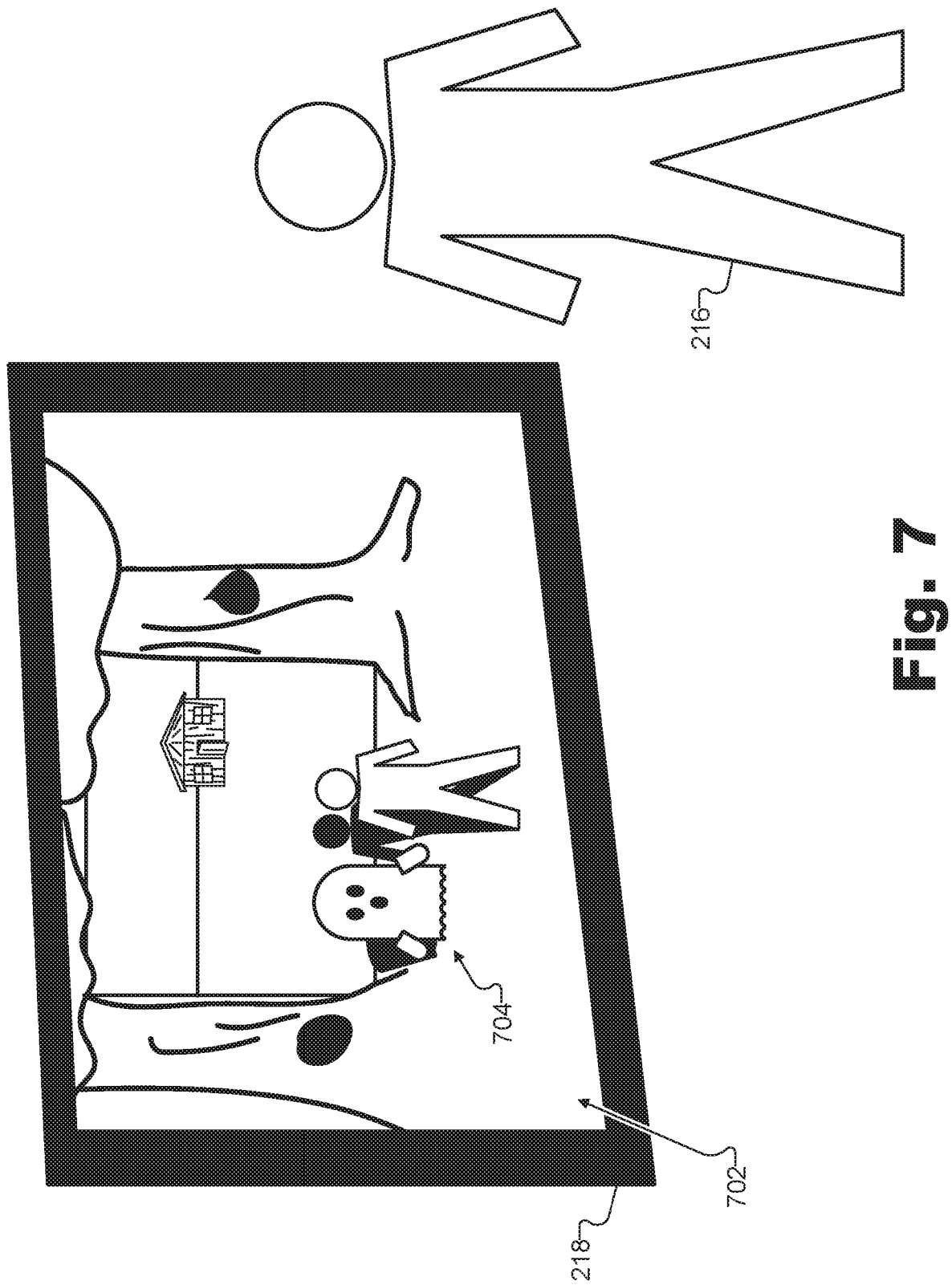
FIGS. 7-8 illustrate exemplary aspects of augmented representations on the interaction of FIG. 6 between the virtual character avatar and the interactive user according to embodiments described herein.

As one exemplary augmentation, an interaction between a virtual character avatar and an interactive user may depict the virtual character avatar emerging from screen 214 to interact with the interactive user in the real world or in a hybrid world depicted in the augmented representation to include elements of both the real world and the virtual world. For example, the virtual character avatar may be depicted to emerge from screen 214 (e.g., exit the virtual world through screen 214) to join the interactive user in the real world or in a hybrid world that exists outside screen 214 but is visually augmented to feature virtual elements consistent with the virtual world. To illustrate, FIG. 7 shows an augmented representation 702 that includes an augmentation 704. Specifically, as shown, the virtual ghost character, which, as shown in representation 602 may actually be constrained to the virtual world, is depicted in augmented representation 702 to have emerged from the screen and exited the virtual world to join the interactive user in the real world.

To accomplish this effect, extended reality technology used to generate augmented representation 702 may be configured to extract the captured virtual character avatar (i.e., the virtual character avatar as captured by direct video capture and witnessed by the interactive user and other spectators at the scene of the immersive character interaction experience) and to replace the captured virtual character avatar with augmentation 704, which may have a similar or identical appearance to the captured virtual character avatar but may be located in the real world with the interactive user. In this way, augmented representation 702 may create an illusion for non-interactive observer 216 that the virtual character avatar has walked or floated out of the video wall toward the interactive user, as shown. To maximize the immersive effect of this augmentation, system 100 may render augmented representation 702 in a manner that accounts for real-world lighting effects (e.g., as illustrated by the shadow of augmented representation 702), as well as virtual-world lighting effects and/or any other effects as may help create the illusion that the character is actually present in the real world or the hybrid world with the interactive user.

As another exemplary augmentation, the interaction between the virtual character avatar and the interactive user generated for the augmented representation may depict a simulated lighting effect of virtual-world light in the real world. This may be understood to be an inverse situation of the one described above in which real-world light is accounted for in the virtual world. For instance, shadows cast in the virtual world may appear to enter into the real world, laser guns or flashlight beams originating in the virtual world may be shown to exit the screen and affect the lighting of the real world, and so forth.

Figure 8:
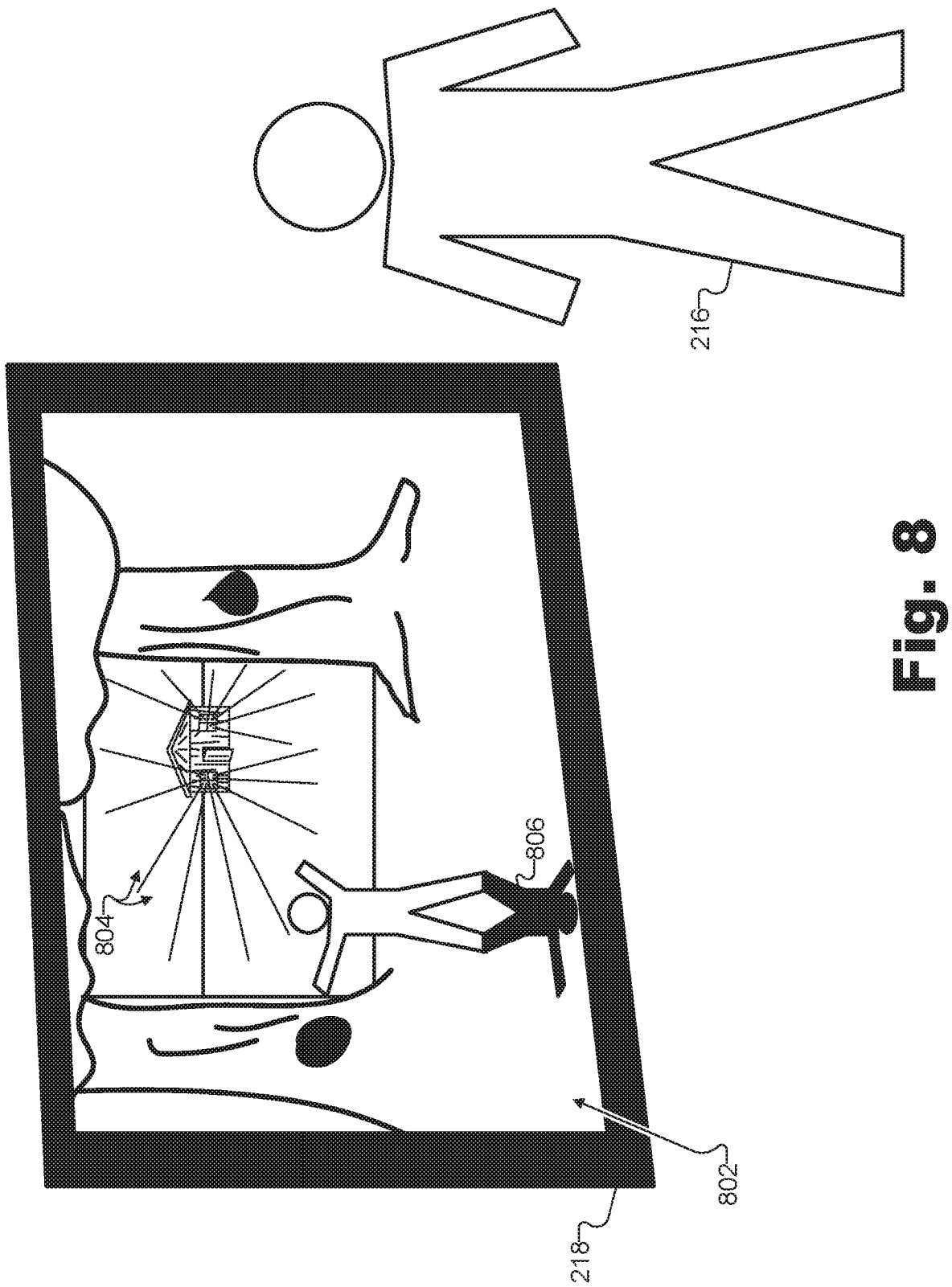

To illustrate, FIG. 8 shows an augmented representation 802 that includes a significant amount of virtual-world light 804 that creates a simulated lighting effect 806 in the real world. In this example, for instance, the interactive user may be performing a gesture to banish the ghost character back to the haunted house, as described above. As the ghost character is forced back to the haunted house in this way, the large burst of virtual-world light 804 may originate from the house to indicate the successful annihilation of the ghost. In augmented representation 802, virtual-world light 804 may be shown to light up the real world in a more dramatic way than what is captured with a direct video capture or experienced by the interactive user. To illustrate this, augmentation 806 is shown to represent a distinctive shadow of the interactive user that is created by virtual-world light 804. This shadow augmentation may be created or emphasized (to the extent that a real but less distinct shadow is actually cast due to light from the video wall) using extended reality technology in a similar manner as described above.

Various other augmentations of these or other types may similarly be applied to an augmented representation presented to a non-interactive observer 216. For example, objects or effects (e.g., wind, etc.) from the virtual world may also appear to emerge from the screen into the real world, or the virtual portal into the virtual world created by the video wall may be made to enlarge so that there is no discernible difference between the real world and the virtual world to non-interactive observer 216. In some examples, the interactive user may appear to walk into the virtual world instead of or in addition to the virtual character avatar exiting the virtual world. The interactive user could also be made to appear to fly in the augmented representation, or to perform other such behaviors that are not actually performed by the interactive user. In certain implementations, two-dimensional virtual character avatars that appear to be flat on the video wall viewed by the interactive user may be made to appear three-dimensional in the virtual representation. In all of these and various other potential augmentation examples, a view of the immersive character interaction experience scene may be captured directly (e.g., using a video capture device), the captured view may be augmented in any of the ways described herein or in any other suitable ways, and the augmented view may be presented on screen 218 as an augmented representation (e.g., augmented representation 702, 802, etc.).

Figure 9:
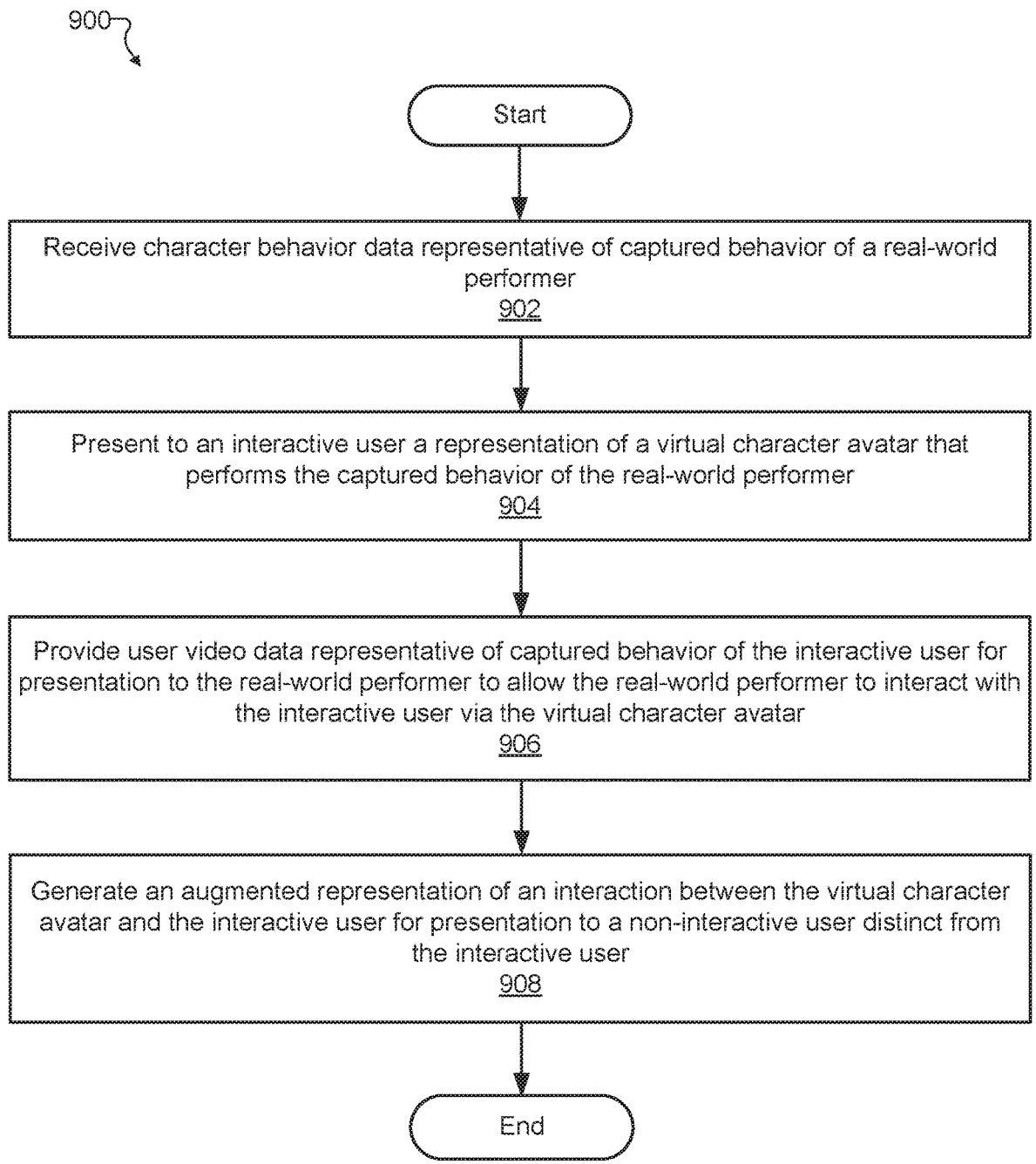
FIG. 9 illustrates an exemplary method for creating an immersive character interaction experience according to embodiments described herein.

FIG. 9 illustrates an exemplary method 900 for creating an immersive character interaction experience. While FIG. 9 illustrates exemplary operations according to one embodiment, other embodiments may omit, add to, reorder, and/or modify any of the operations shown in FIG. 9. One or more of the operations shown in FIG. 9 may be performed by a character interaction system such as system 100, any components included therein, and/or any implementation thereof.

In operation 902, a character interaction system located at a first site may receive character behavior data. The character behavior data may be representative of captured behavior of a real-world performer located at a second site geographically separated from the first site. For example, the character behavior data may be transmitted from the second site to be received at the first site by way of a network. Operation 902 may be performed in any of the ways described herein.

In operation 904, the character interaction system may present a representation of a virtual character avatar that performs the captured behavior of the real-world performer. For example, the virtual character avatar may perform the captured behavior in real-time synchrony with the real-world performer at the second site based on the character behavior data. This representation of the virtual character avatar in operation 904 may be presented to an interactive user at the first site. Operation 904 may be performed in any of the ways described herein.

In operation 906, the character interaction system may provide user video data representative of captured behavior of the interactive user for presentation to the real-world performer at the second site. Operation 906 may be performed during the presenting, in operation 904, of the representation of the virtual character avatar to the interactive user. As such, the user video data provided in operation 906 may allow the real-world performer to interact, via the virtual character avatar and in real time, with the interactive user. Operation 906 may be performed in any of the ways described herein.

In operation 908, the character interaction system may generate an augmented representation of an interaction between the virtual character avatar and the interactive user for presentation to a non-interactive observer distinct from the interactive user. Operation 908 may be performed in any of the ways described herein.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 10:
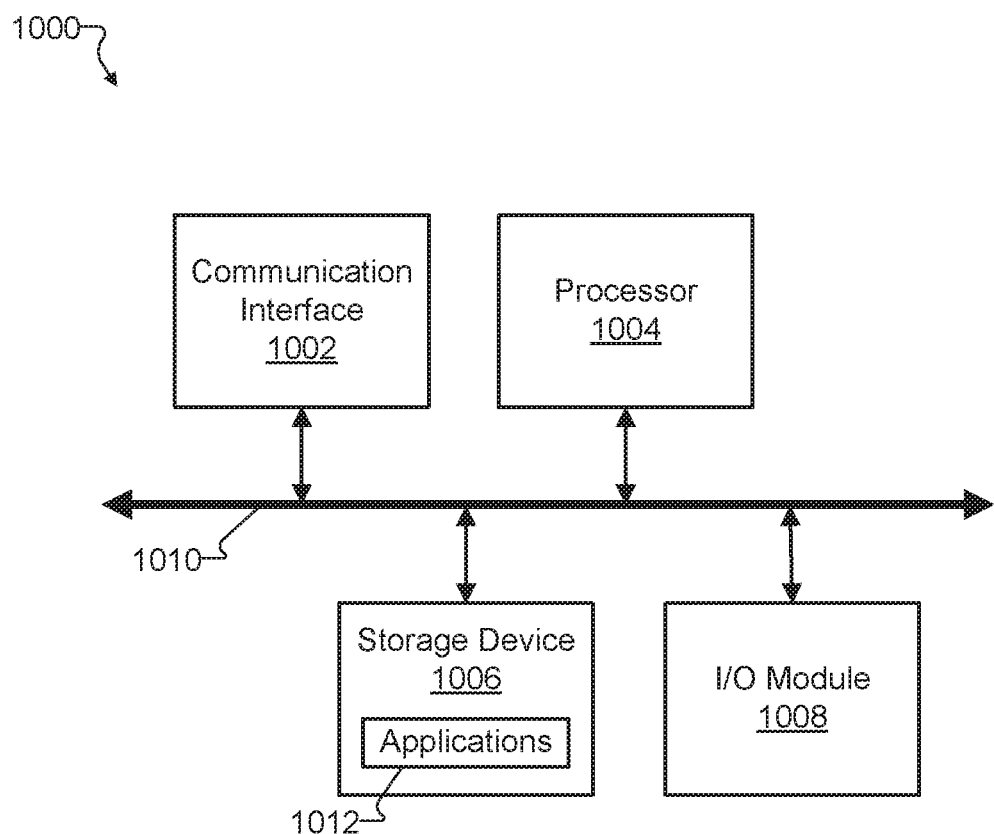
FIG. 10 illustrates an exemplary computing device according to principles described herein.

FIG. 10 illustrates an exemplary computing device 1000 that may be specifically configured to perform one or more of the processes described herein. For example, computing device 1000 may include or implement (or partially implement) a character interaction system such as system 100, a character performer system such as system 206, a capture system such as one of capture systems 212 or 224, a device associated with one of screens 214, 218, 226, or 228, a multi-access server (e.g., MEC server) implemented on network 208, or any other computing devices described herein.

As shown in FIG. 10, computing device 1000 may include a communication interface 1002, a processor 1004, a storage device 1006, and an input/output ("I/O") module 1008 communicatively connected via a communication infrastructure 1010. While an exemplary computing device 1000 is shown in FIG. 10, the components illustrated in FIG. 10 are not intended to be limiting. Additional or alternative components may be used in other embodiments. Components of computing device 1000 shown in FIG. 10 will now be described in additional detail.

Communication interface 1002 may be configured to communicate with one or more computing devices. Examples of communication interface 1002 include, without limitation, a wired network interface (such as a network interface card), a wireless network interface (such as a wireless network interface card), a modem, an audio/video connection, and any other suitable interface.

Processor 1004 generally represents any type or form of processing unit capable of processing data or interpreting, executing, and/or directing execution of one or more of the instructions, processes, and/or operations described herein. Processor 1004 may direct execution of operations in accordance with one or more applications 1012 or other computer-executable instructions such as may be stored in storage device 1006 or another computer-readable medium.

Storage device 1006 may include one or more data storage media, devices, or configurations and may employ any type, form, and combination of data storage media and/or device. For example, storage device 1006 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1006. For example, data representative of one or more executable applications 1012 configured to direct processor 1004 to perform any of the operations described herein may be stored within storage device 1006. In some examples, data may be arranged in one or more databases residing within storage device 1006.

I/O module 1008 may include one or more I/O modules configured to receive user input and provide user output. One or more I/O modules may be used to receive input for a single virtual experience. I/O module 1008 may include any hardware, firmware, software, or combination thereof supportive of input and output capabilities. For example, I/O module 1008 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1008 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1000. For example, one or more applications 1012 residing within storage device 1006 may be configured to direct processor 1004 to perform one or more processes or functions associated with processing facility 104 of system 100. Likewise, storage facility 102 of system 100 may be implemented by or within storage device 1006.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   receiving, by a character interaction system located at a first site, character behavior data representative of captured behavior of a real-world performer located at a second site geographically separated from the first site, the character behavior data transmitted from the second site to the first site by way of a network;
   presenting, by the character interaction system to an interactive user at the first site and based on the character behavior data, a first representation on a first screen viewed by the interactive user at the first site, the first representation depicting a virtual character avatar that performs, in real-time synchrony with the real-world performer at the second site, the captured behavior of the real-world performer;
   providing, by the character interaction system during the presenting of the first representation on the first screen, user video data representative of captured behavior of the interactive user for presentation to the real-world performer at the second site to allow the real-world performer to interact, via the virtual character avatar and in real time, with the interactive user; and
   generating, by the character interaction system for presentation to a non-interactive observer on a second screen distinct from the first screen, a second representation depicting the first screen and the interactive user at the first site, wherein the second representation is configured to show an augmented interaction, between the virtual character avatar and the interactive user, that is distinct in at least one aspect from an interaction actually occurring at the first site.

2. The method of claim 1, wherein the augmented interaction between the virtual character avatar and the interactive user depicts, on the second screen, the virtual character avatar emerging from the first screen to interact with the interactive user.

3. The method of claim 1, wherein a plurality of interaction properties of a real-time interaction, via the virtual character avatar, between the real-world performer and the interactive user includes:
a mutual observation interaction property in which the interactive user observes the virtual character avatar performing the captured behavior of the real-world performer concurrently with the real-world performer observing the interactive user; and
a mutual conversation interaction property in which the interactive user hears the virtual character avatar speaking words spoken by the real-world performer concurrently with the real-world performer hearing words spoken by the interactive user to the virtual character avatar.

4. The method of claim 1, wherein a real-time interaction, via the virtual character avatar, between the real-world performer and the interactive user includes a non-performed behavior interaction property in which the virtual character avatar performs a behavior that is initiated in a manner other than by being performed by the real-world performer.

5. The method of claim 1, wherein a real-time interaction, via the virtual character avatar, between the real-world performer and the interactive user includes a virtual manipulation interaction property in which, by performing a particular action, the interactive user exerts a physical influence over the virtual character avatar or another virtual aspect of a virtual world inhabited by the virtual character avatar.

6. The method of claim 1, wherein the first representation depicting the virtual character avatar accounts for a simulated lighting effect of real-world light, the real-world light originating in a real world inhabited by the interactive user and virtually propagating into a virtual world inhabited by the virtual character avatar.

7. The method of claim 1, wherein:
the character behavior data received from the second site originates, at different times, from a first character behavior data stream representative of the captured behavior of the real-world performer and from a second character behavior data stream representative of additional captured behavior of an additional real-world performer located at the second site; and
the receiving of the character behavior data proceeds uninterrupted when a transmission of the first character behavior data stream is switched to a transmission of the second character behavior data stream.

8. The method of claim 1, wherein the first representation depicting the virtual character avatar is presented to the interactive user on a video wall sized and integrated into a real-world environment such that the first representation depicting the virtual character avatar is an actual-size representation configured to simulate the virtual character avatar being present in the real world.

9. The method of claim 1, wherein the virtual character avatar is presented with a distinct appearance from an appearance of the real-world performer whose captured behavior the virtual character avatar performs.

10. The method of claim 1, wherein:
the first representation depicting the virtual character avatar is presented to the interactive user on a screen viewed by the interactive user as the interactive user inhabits a real world; and
the augmented interaction between the virtual character avatar and the interactive user depicts a simulated lighting effect of virtual-world light in the real world.

11. A system comprising:
a memory storing instructions; and
a processor located at a first site, the processor communicatively coupled to the memory and configured to execute the instructions to:
receive character behavior data representative of captured behavior of a real-world performer located at a second site geographically separated from the first site, the character behavior data transmitted from the second site to the processor at the first site by way of a network;
present, to an interactive user at the first site and based on the character behavior data, a first representation on a first screen viewed by the interactive user at the first site, the first representation depicting a virtual character avatar that performs, in real-time synchrony with the real-world performer at the second site, the captured behavior of the real-world performer;
provide, during the presenting of the first representation on the first screen, user video data representative of captured behavior of the interactive user for presentation to the real-world performer at the second site to allow the real-world performer to interact, via the virtual character avatar and in real time, with the interactive user; and
generate, for presentation to a non-interactive observer on a second screen distinct from the first screen, a second representation depicting the first screen and the interactive user at the first site, wherein the second representation is configured to show an augmented interaction between the virtual character avatar and the interactive user, that is distinct in at least one aspect from an interaction actually occurring at the first site.

12. The system of claim 11, wherein the augmented interaction between the virtual character avatar and the interactive user depicts, on the second screen, the virtual character avatar emerging from the first screen to interact with the interactive user.

13. The system of claim 11, wherein a plurality of interaction properties of a real-time interaction, via the virtual character avatar, between the real-world performer and the interactive user includes:
a mutual observation interaction property in which the interactive user observes the virtual character avatar performing the captured behavior of the real-world performer concurrently with the real-world performer observing the interactive user; and
a mutual conversation interaction property in which the interactive user hears the virtual character avatar speaking words spoken by the real-world performer concurrently with the real-world performer hearing words spoken by the interactive user to the virtual character avatar.

14. The system of claim 11, wherein a real-time interaction, via the virtual character avatar, between the real-world performer and the interactive user includes a non-performed behavior interaction property in which the virtual character avatar performs a behavior that is initiated in a manner other than by being performed by the real-world performer.

15. The system of claim 11, wherein a real-time interaction, via the virtual character avatar, between the real-world performer and the interactive user includes a virtual manipulation interaction property in which, by performing a particular action, the interactive user exerts a physical influence over the virtual character avatar or another virtual aspect of a virtual world inhabited by the virtual character avatar.

16. The system of claim 11, wherein the first representation depicting the virtual character avatar accounts for a simulated lighting effect of real-world light, the real-world light originating in a real world inhabited by the interactive user and virtually propagating into a virtual world inhabited by the virtual character avatar.

17. The system of claim 11, wherein:
the character behavior data received from the second site originates, at different times, from a first character behavior data stream representative of the captured behavior of the real-world performer and from a second character behavior data stream representative of additional captured behavior of an additional real-world performer located at the second site; and
the receiving of the character behavior data proceeds uninterrupted when a transmission of the first character behavior data stream is switched to a transmission of the second character behavior data stream.

18. The system of claim 11, wherein the first representation depicting the virtual character avatar is presented to the interactive user on a video wall sized and integrated into a real-world environment such that the first representation depicting the virtual character avatar is an actual-size representation configured to simulate the virtual character avatar being present in the real world.

19. The system of claim 11, wherein the virtual character avatar is presented with a distinct appearance from an appearance of the real-world performer whose captured behavior the virtual character avatar performs.

20. A non-transitory computer-readable medium storing instructions that, when executed, direct a processor of a computing device located at a first site to:
receive character behavior data representative of captured behavior of a real-world performer located at a second site geographically separated from the first site, the character behavior data transmitted from the second site to the processor at the first site by way of a network;
present, to an interactive user at the first site and based on the character behavior data, a first representation on a first screen viewed by the interactive user at the first site, the first representation depicting a virtual character avatar that performs, in real-time synchrony with the real-world performer at the second site, the captured behavior of the real-world performer;
provide, during the presenting of the first representation on the first screen, user video data representative of captured behavior of the interactive user for presentation to the real-world performer at the second site to allow the real-world performer to interact, via the virtual character avatar and in real time, with the interactive user; and
generate, for presentation to a non-interactive observer on a second screen distinct from the first screen, a second representation depicting the first screen and the interactive user at the first site, wherein the second representation is configured to show an an augmented interaction between the virtual character avatar and the interactive user, that is distinct in at least one aspect from an interaction actually occurring at the first site.

* * * * *